UNITED STATES PATENT OFFICE.

PELLEGRINO BONFIGLIO, OF NEW YORK, N. Y.

DETERGENT.

SPECIFICATION forming part of Letters Patent No. 648,229, dated April 24, 1900.

Application filed December 29, 1899. Serial No. 742,016. (No specimens.)

*To all whom it may concern:*

Be it known that I, PELLEGRINO BONFIGLIO, a citizen of the Kingdom of Italy, (but having declared my intention to become a citizen of the United States of America,) and a resident of No. 217 East Eighty-fourth street, in the city of New York, county of New York, and State of New York, have invented certain new and useful Improvements in Detergents, of which the following is a specification.

This invention has reference to a novel composition for the renovation of old, exposed, polished, or varnished wood; and it is the special object of this invention to prepare the wood again in such a manner that it will reacquire its former fresh and new grain by virtue of the treatment with my novel composition without scraping or scratching, whereby the surface of the wood would suffer, thus leaving the wood in a condition to be revarnished or repolished.

My novel composition is applied after the old varnish or polish has been completely removed. It is applied in liquid form, and finally the object is revarnished and repolished, as will be fully described farther down.

The composition is prepared in the following manner: First I prepare a solution of chlorid of calcium in any suitable vessel and dilute same, so that a five-per-cent. solution is obtained. Of this solution I take one-fourth of a gallon and dissolve therein one-half pound of carbonate of soda, when, as is well known, a precipitate of carbonate of lime will result and chlorid of sodium is formed. This is done for the purpose of obtaining a pure carbonate of lime. Now one gallon of muriatic acid of 20° Baumé is gradually added, whereby the carbonate of lime is decomposed and carbonic-acid gas passes off, and when the effervescence terminates then the liquid is ready for use. If necessary, the composition is filtered. It is best preserved in glass-stoppered bottles.

In applying the composition I substantially proceed as follows: The wood is first washed with liquid caustics, preferably strong ammonia, until all the old varnish or polish is completely removed. Then it is washed with fresh water to take off the remaining ammonia, and while the wood is still wet the composition is applied with a hair brush. Then the wood is washed immediately several times with fresh water, at the same time rubbing it with a small scrubbing-brush until all the excess of the composition has been removed. Then the wood is dried, when it appears to be renovated, showing its former fresh and new grain, and now it is ready for revarnishing and repolishing.

It is plainly understood that wood which was not varnished and is merely old or suffered from exposure to weather needs not be treated with liquid caustics. It is merely washed with water before my composition is applied.

If necessary, the surface of the wood is made smooth by rubbing it with sandpaper.

My novel composition is used especially for renovating old furniture, front doors, vestibules, floors, &c., and it produces the new fresh grain of the wood very quickly.

Having thus described my invention, I claim as new and desire to secure by Letters Patent—

A composition for renovating old, exposed, polished or varnished wood, resulting from the combination of a five-per-cent. solution of chlorid of calcium one-quarter of a gallon, carbonate of sodium one-half pound dissolved therein, and muriatic acid of 20° Baumé one gallon, as specified.

Signed by me at the city of New York, New York county, this 18th day of December, 1899.

PELLEGRINO BONFIGLIO.

Witnesses:
JOSEPH GIFUNI,
ALFRED H. MARVIN.